United States Patent
Djan-Sampson et al.

(10) Patent No.: US 10,804,707 B2
(45) Date of Patent: Oct. 13, 2020

(54) SYSTEMS AND METHODS FOR DYNAMIC MANAGEMENT OF WIND TURBINES PROVIDING REACTIVE POWER

(71) Applicant: General Electric Company, Schenectady, NY (US)

(72) Inventors: Patrick Djan-Sampson, Schenectady, NY (US); Alfredo Sebastian Achilles, Niskayuna, NY (US); Enno Ubben, Steinfurt (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/163,854

(22) Filed: Oct. 18, 2018

(65) Prior Publication Data
US 2020/0127460 A1   Apr. 23, 2020

(51) Int. Cl.
| | |
|---|---|
| *H02J 3/38* | (2006.01) |
| *F03D 7/02* | (2006.01) |
| *F03D 7/04* | (2006.01) |
| *H02J 3/18* | (2006.01) |
| *H02P 101/15* | (2016.01) |

(52) U.S. Cl.
CPC .............. *H02J 3/386* (2013.01); *F03D 7/028* (2013.01); *F03D 7/0272* (2013.01); *F03D 7/048* (2013.01); *H02J 3/1892* (2013.01); *H02P 2101/15* (2015.01)

(58) Field of Classification Search
CPC ........ F03D 7/0272; F03D 7/028; F03D 7/048; H02J 3/386
See application file for complete search history.

(56) References Cited

U.S. PATENT DOCUMENTS

| | | | | |
|---|---|---|---|---|
| 2010/0025994 A1* | 2/2010 | Cardinal | ............... | F03D 7/0284 290/44 |
| 2010/0298991 A1* | 11/2010 | Alonso Sadaba | ..... | F03D 7/0272 700/276 |

(Continued)

FOREIGN PATENT DOCUMENTS

WO   WO 2017/135937 A1   8/2017

OTHER PUBLICATIONS

EP Search Report, dated Feb. 27, 2020 for Application No. EP 19203344.

*Primary Examiner* — Vincent H Tran
(74) *Attorney, Agent, or Firm* — Dority & Manning, P.A.

(57) ABSTRACT

Systems and methods for controlling wind turbines providing reactive power are provided. In particular, a method for controlling a power system that includes a controller and one or more wind turbines electrically connected to a power grid through a point of interconnection can be provided. The method can include receiving signals from a sensor associated with the wind turbines. The method can also include determining wind turbines that are operating in low wind or no wind operating conditions based, at least in part, on the one or more of the sensor signals. The method can also include determining a reactive power capability of the wind turbines operating in low wind or no wind conditions and generating control signals based, at least in part, on the reactive power capability of the wind turbines. The method can also include controlling an operational state of the wind turbines based on the control signals.

14 Claims, 7 Drawing Sheets

(56) References Cited

U.S. PATENT DOCUMENTS

| | | | |
|---|---|---|---|
| 2010/0308585 A1* | 12/2010 | Jorgensen | F03D 7/0284 |
| | | | 290/44 |
| 2011/0178646 A1* | 7/2011 | Haj-Maharsi | H02J 3/1885 |
| | | | 700/287 |
| 2012/0101643 A1* | 4/2012 | Kirchner | F03D 7/0284 |
| | | | 700/287 |
| 2014/0142771 A1* | 5/2014 | Nielsen | G06F 1/26 |
| | | | 700/291 |
| 2015/0275862 A1* | 10/2015 | Babazadeh | H02J 3/50 |
| | | | 290/44 |
| 2015/0295529 A1* | 10/2015 | Rose, Jr. | H02P 9/305 |
| | | | 290/44 |
| 2016/0237990 A1* | 8/2016 | Ubben | H02J 3/1885 |
| 2017/0179727 A1* | 6/2017 | Valderrey Sanchez | |
| | | | H02J 3/386 |
| 2017/0234299 A1* | 8/2017 | Kjær | F03D 7/042 |
| | | | 290/44 |

* cited by examiner

SYSTEMS AND METHODS FOR DYNAMIC MANAGEMENT OF WIND TURBINES PROVIDING REACTIVE POWER

FIELD

The present disclosure relates generally to systems and methods for controlling wind turbines, and more particularly, systems and methods for controlling wind turbines providing reactive power.

BACKGROUND

Wind power is considered one of the cleanest, most environmentally friendly energy sources presently available, and wind turbines have gained increased attention in this regard. Existing electrical power distribution systems (e.g., power grids) can be utilized for distributing power from renewable energy sources, such as wind, if control systems and methodologies are utilized to coordinate power produced by the renewable energy sources, the power demand on the power distribution systems and the power consumed based on the varying operational states that are inherent with respect to renewable energy sources. For example, the operational state of a wind turbine can vary based on wind speeds or the absence of wind.

As wind power is not a power source having a timely constant power output, but includes variations, operators of power distribution systems have to take this into account. One of the consequences is, for example, that the distribution and transmission networks have become more difficult to manage. This pertains also to the management of the amount of reactive power introduced into a power distribution system.

Real power is generated or consumed when voltage and current are in phase. Reactive power is generated or consumed when voltage and current are out of phase (e.g., by 90 degrees). Maintenance of voltage within electrical power distribution systems is important to the stability of the system with respect to power delivery and power flow. Failing to maintain voltage within electrical power distribution systems can have negative consequences and effects on the systems, including voltage collapse which can cause damage to generation, transmission and distribution equipment and result in blackouts. Reactive power is either generated or absorbed by components within electrical power distribution systems to maintain system voltage levels, commonly known as providing "voltage support" or "voltage regulation." Thus, reactive power is energy that must be produced for the maintenance and proper operation of electrical power distribution systems. The stability of electrical power distribution systems (e.g., electrical grids) is related to the generation and/or consumption of reactive power; therefore, it is usually necessary to control the reactive power output from the renewable source to fulfill electrical demand while providing stability for the electrical grid.

Wind turbines and wind farms can be used to provide reactive power. Reactive power required for voltage regulation is often generated proportionally by and between one or more wind turbines in a wind farm based on the reactive power capability of each wind turbine. However, when wind turbines are kept operational to provide reactive power, the wind turbines will consume some amount of active power or real power even when the reactive power capabilities of the wind turbine are not being fully utilized. In some instances, wind turbines used to provide reactive power can cause active power consumption that is comparable to the active power consumption of wind turbines providing significant active power generation. Accordingly, in a wind farm setting, inefficient usage of multiple wind turbines that are kept operational to provide reactive power can result in significant and unnecessary active power consumption. Such significant and unnecessary active power consumption is a waste of available real power and can result in unnecessary costs to the wind farm or wind turbine operator.

Accordingly, systems and methods for controlling wind turbines providing reactive power which increase efficiency with respect to or reduce active or real power consumption, but that maintain the ability of the wind turbines and wind farms to provide suitable amounts of reactive power to electrical power distribution systems would be useful and welcomed.

BRIEF DESCRIPTION

Aspects and advantages of the invention will be set forth in part in the following description, or may be obvious from the description, or may be learned through practice of example embodiments of the present disclosure.

One example aspect of the present disclosure is directed to a method for controlling a wind farm electrical power system. The wind farm electrical power system can include a controller and one or more wind turbines electrically connected to a power grid through a point of interconnection. The method includes receiving, by the controller, one or more signals from a sensor associated with the one or more wind turbines. The controller can determine one or more wind turbines that are operating in low wind or no wind conditions based on the sensor signals. The controller is also used to determine a reactive power capability of the wind turbines operating in low wind or no wind conditions. The method includes generating, by the controller, one or more control signals based, at least in part, on the reactive power capability of the one or more wind turbines operating in low wind or no wind conditions and controlling an operational state of the one or more wind turbines based, at least in part, on the one or more control signals.

Another example aspect of the present disclosure is directed to a control system for operating a wind farm electrical power system. The wind farm electrical power system includes one or more wind turbines electrically connected to a power grid through a point of interconnection. The control system includes one or more processors, and one or more memory devices. The memory devices can be configured to store instructions that when executed by the processors can cause the processors to perform operations. The operations can include receiving one or more signals from a sensor associated with the one or more wind turbines and determining one or more wind turbines that are operating in low wind or no wind operating conditions based, at least in part, on the one or more sensor signals. The operations can also include determining a reactive power capability of the one or more wind turbines operating in low wind or no wind conditions, generating one or more control signals based, at least in part, on the reactive power capability of the one or more wind turbines operating in low wind or no wind conditions and controlling an operational state of the one or more wind turbines based, at least in part, on the one or more control signals.

Another example aspect of the present disclosure is directed to a wind farm. The wind farm can include one or more wind turbines electrically connected to a power grid through a point of interconnection. The wind farm can include a controller configured to perform one or more operations. The operations can include receiving one or more signals from a sensor associated with the one or more wind turbines and determining one or more wind turbines that are operating in low wind or no wind operating conditions based, at least in part, on the one or more sensor signals. The operations can also include determining a reactive power capability of the one or more wind turbines operating in low wind or no wind conditions and generating one or more control signals based, at least in part, on the reactive power capability of the one or more wind turbines operating in low wind or no wind conditions and controlling an operational state of the one or more wind turbines based, at least in part, on the one or more control signals.

Variations and modifications can be made to these example aspects of the present disclosure. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
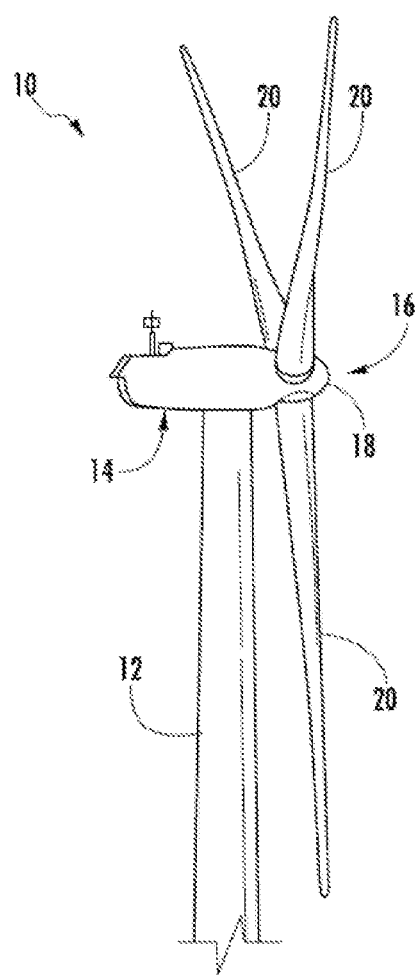
FIG. 1 depicts a perspective view of a portion of a wind turbine according to example embodiments of the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

With the growing success of wind power production, this form of power has gained significant market share. As wind power is not a power source having a timely constant power output, but includes variations, for example due to variations of the wind speed, operators of power distribution networks have to take this into account. One of the consequences is, for example, that the distribution and transmission networks have become more difficult to manage. This pertains also to the management of the amount of reactive power flow in a network.

Example aspects of the present disclosure are directed to systems and methods for controlling wind turbines, and more particularly, systems and methods for controlling wind turbines providing reactive power. The capacity of wind turbines to produce real power is based on environmental conditions, including wind conditions. During no wind or low wind conditions wind turbines can be used to provide reactive power capabilities for voltage regulation (e.g., voltage support), reactive power (e.g., VAR, volt-ampere reactive), and power factor (Pf) regulation. No wind conditions exist when the wind speed at the wind turbine is below a wind speed threshold which represents the minimum amount of wind necessary to cause the rotor and rotor blades to turn. Low wind conditions exist when the wind speed is below a wind speed threshold at which there is an inadequate amount of wind to permit a wind turbine to produce or generate an amount of real power that exceeds the amount of real power consumed by the wind turbine to remain operational. In other words, the wind speed available at the wind turbine is such that the wind turbine cannot generate enough real power to satisfy the real power demands or needs of the wind turbine. Low wind condition can also represent a steady wind condition that will cause the rotor of the wind turbine to move beyond the cut-in speed of the turbine (this is typically a steady state wind speed of approximately 3 to 4 m/s).

In many situations, there is no requirement or need for reactive power capability beyond the reactive power required for voltage regulation, VAR and power factor regulation based on present grid conditions. In many instances, wind turbines connected to a power grid have reactive power capabilities which exceed the requirements of the power grid. As such, example aspects of the present disclosure are directed to systems and methods for controlling wind turbines and wind farms such that reactive power can be provided at the point of interconnection (POI) of a wind farm or a wind turbine and a power grid when the wind turbine or one or more wind turbines in the wind farm are not being utilized for active or real power generation.

According to example aspects of the systems and methods of the present disclosure, wind turbines and wind farms can be dynamically managed or controlled such that these renewable energy sources (e.g., wind turbines) are operated more efficiently with respect to real power consumption, while also maintaining the ability of the wind turbines and wind farms to provide suitable amounts of reactive power to electrical power distribution system or power grid. When wind turbines remain operational during low wind or no wind conditions, the wind turbines and wind farm consume some amount of real power or incur some amount of active power consumption even when some or all of the wind turbines are not being fully utilized by a wind farm controller to provide reactive power. When operating a wind turbine or a plurality of wind turbines within a wind farm to provide reactive power, it can be beneficial to regulate or control which wind turbines provide reactive power based, at least in part, on the reactive power required to regulate voltage, VAR and/or Pf at the POI between the wind turbine or wind farm and the power grid. Wind turbines operating in no wind or low wind conditions, or those providing reactive power in other conditions, can be dynamically and efficiently managed through example embodiments of the systems and methods of the present disclosure by selectively activating or deactivating one or more of the wind turbines, based upon one or more characteristics of the wind turbines (e.g., wind turbine size, location, age, maintenance status), characteristics of the power grid (e.g., strength or condition of the grid, strength or condition of the connection of the wind farm or wind turbine to the grid, grid architecture, grid location), characteristics of the load on the grid (e.g., loads that are heavy or variable) and/or the environmental conditions (e.g., the wind conditions for the one or more wind turbines).

According to example aspects of the systems and methods of the present disclosure, wind turbines can be dynamically managed such that a minimum or near minimum number of wind turbines remain activated to maintain desired reactive power conditions at the POI during no wind or low wind conditions. Dynamic management of wind turbines providing reactive power by selective activation (i.e., turning on or bringing to an operational state) or deactivation (i.e., turning off or bringing to a nonoperational state) based upon one or more characteristics of the wind turbines, the power grid, the load on the grid and/or the environmental conditions are advantageous with regard to the operation of a wind farm or wind turbine and allows for smooth, continuous, suitable and fast voltage regulation and voltage support in most, if not all, operating conditions, and can have the technical effect and benefit of providing grid reinforcement and appropriate or required amounts of reactive power, while simultaneously providing the advantage of reducing the real power consumed by inactive wind turbines and/or wind turbines that are not being fully utilized for their the reactive power capabilities. In this way, example aspects of the present disclosure can provide a number of technical effects and benefits, including reducing or eliminating the unnecessary consumption and waste of available real power by the wind turbines and reducing operational costs to the wind farm or wind turbine owner or operator.

Dynamic management of wind turbines providing reactive power by selective activation and deactivation can also allow for the reduction or elimination of grid reinforcements that as specifically designed or needed for no wind or low wind conditions. Such systems and methods also provide the advantages of existing wind turbines to provide reactive power that is necessary for grid support so that other generating resources which may be connected to the grid may be more efficiently or economically used for power generation and distribution. The technical effects and benefits of such advantages include more economic system operation by reducing or eliminating requirements for transmission reinforcement and reducing or eliminating the consumption of real power by wind turbines that are not contributing to the satisfaction of the reactive power requirements of the grid. Other technical effects and benefits of such advantages of the example systems of methods of the present disclosure include enhanced grid security for grid events, tight voltage regulation under varying conditions, security from system voltage disturbances, and reduced requirements for must-run generation for other generating resources connected to the grid which may be necessary to supply real power to the inactive wind turbines and/or wind farm. In this way, example aspects of the present disclosure can provide a number of technical effects and benefits.

Referring now to the figures, example aspects of the present disclosure will be discussed in greater detail.

FIG. 1 depicts a wind turbine 10 according to example embodiments of the present disclosure. As shown, the wind turbine 10 includes a nacelle 14 that typically houses a generator 28 (shown in FIG. 2). The nacelle 14 is mounted on a tower 12 extending from a support surface. The wind turbine 10 also includes a rotor 16 that includes a plurality of rotor blades 20 attached to a rotating hub 18.

Figure 2:
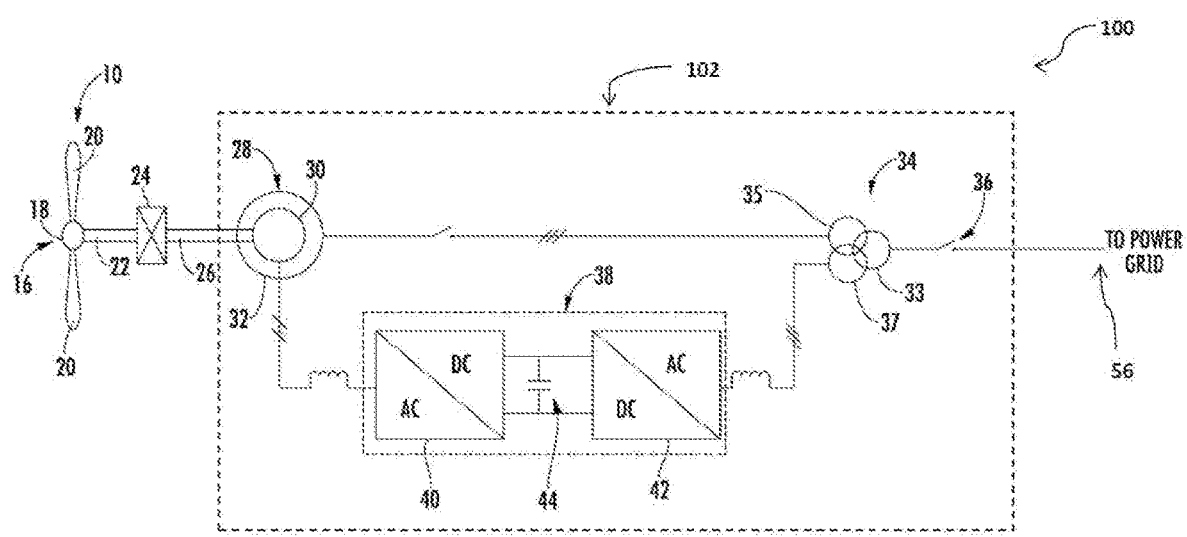
FIG. 2 depicts a schematic diagram of a wind turbine electrical power system according to example embodiments of the present disclosure which is suitable for use with the wind turbine shown in FIG. 1.

FIG. 2 depicts a wind turbine power system 100, which includes a wind turbine 10 and associated power system 102 suitable for use with the wind turbine 10. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is connected to a power grid at a POI 56 via a grid breaker 36. Thus, the main transformer 34 steps up the voltage amplitude of the electrical power such that the transformed electrical power may be further transmitted to the power grid.

In addition, as shown, the generator 28 is electrically coupled to a bi-directional power converter 38 that includes a rotor-side converter 40 joined to a line-side converter 42 via a regulated DC link 44. The rotor-side converter 40 converts the AC power provided from the rotor 30 into DC power and provides the DC power to the DC link 44. The line side converter 42 converts the DC power on the DC link 44 into AC output power suitable for the power grid. Thus, the AC power from the power converter 38 can be combined with the power from the stator 32 to provide multi-phase power (e.g. three-phase power) having a frequency maintained substantially at the frequency of the power grid (e.g. 50 Hz/60 Hz).

The illustrated three-winding transformer 34 can have (1) a 33 kilovolt (kV) medium voltage (MV) primary winding 33 connected to the power grid, (2) a 6 to 13.8 kV MV secondary winding 35 connected to the generator stator 32, and (3) a 690 to 900 volt (V) low-voltage (LV) tertiary winding 37 connected to the line-side power converter 42.

Figure 3:
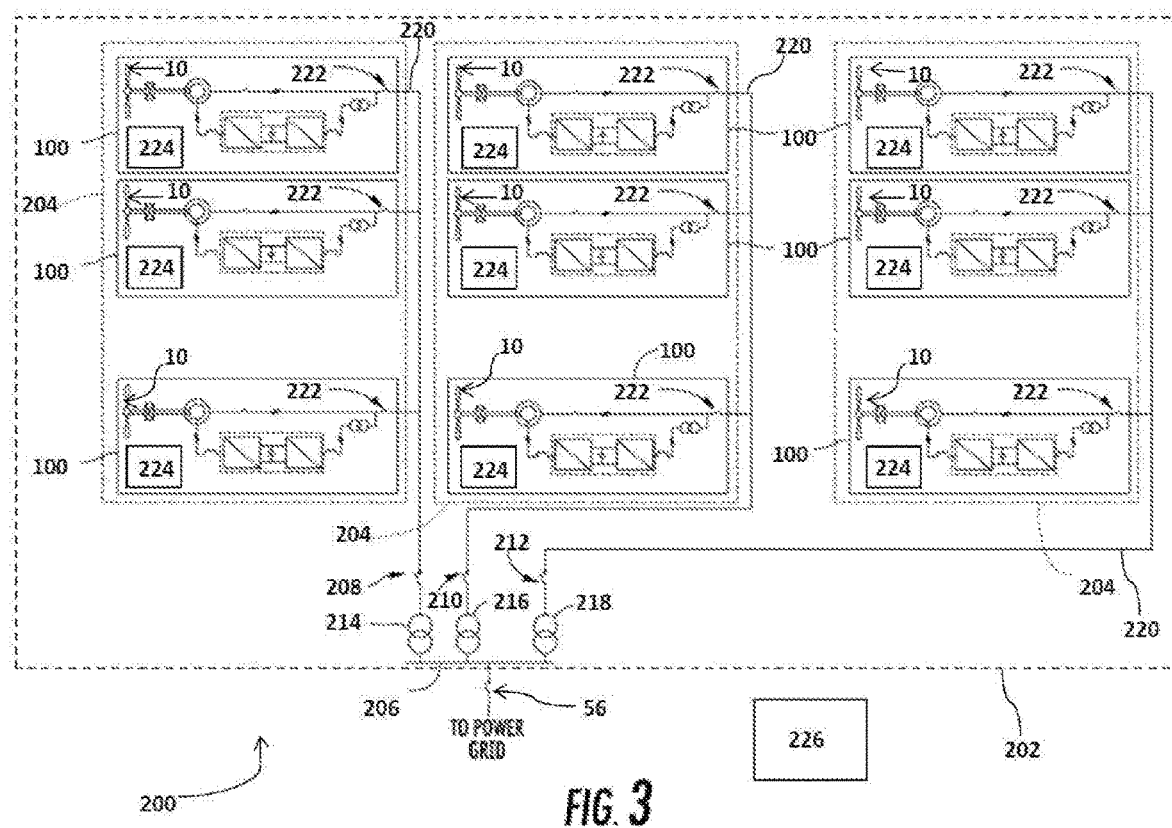
FIG. 3 depicts a schematic diagram of a wind farm electrical power system according to example embodiments of the present disclosure.

FIG. 3 depicts a schematic diagram of one embodiment of a wind farm electrical power system 200 according to example embodiments of the present disclosure. Wind farm electrical power system 200 can include a plurality of wind turbine power systems 100, connected to a power grid via a POI 56. The wind farm electrical power system 200 may include at least two clusters 204 to form an electrical power system 200. Individual wind turbine power systems 100 including of a plurality of wind turbines 10 may be arranged in predetermined geographic locations and electrically connected together to form a wind farm 202.

The electrical power associated with each wind turbine power system 100 can be transmitted to a main line 206 via one or more cluster lines 220. Each wind turbine power system 100 can be connected or disconnected to the one or more cluster lines 220 via one or more switches or breakers 222. Wind turbine power systems 100 may be arranged into a plurality of groups (or clusters) 204 with each group separately connected to a main line 206 via switches 208, 210, 212, respectively. Thus, as shown, each cluster 204 may be connected to a separate transformer 214, 216, 218 via switches 208, 210, 212, respectively, for stepping up the voltage amplitude of the electrical power from each cluster 204 such that the transformed electrical power may be further transmitted to the power grid. In addition, as shown, the transformers 214, 216, 218 are connected to a main line 206 that combines the voltage from each cluster 204 before sending the power to the grid via a POI 56. The POI 56 can be a breaker, switch or other known method of connection to a power grid.

Each wind turbine power system 100 can include one or more controllers, such as turbine controller 224. Turbine controller 224 can be configured to control the components of the wind turbine power system 100, including switches 222, and/or implement some or all of the method steps as described herein. Turbine controller 224 can be located on or within each wind turbine 10 or can be located remotely from each wind turbine 10. Turbine controller 224 can be part of or included with one or more of the other controllers associated with wind turbine power system 100 and/or the wind farm electrical power system 200. Turbine controller 224 can operate switches 222 to connect or disconnect the one or more wind turbine power systems 100 from the cluster lines 220 based at least in part on the reactive power required at the POI 56, and/or based, at least in part, on characteristics of the wind turbine power system 100, wind farm electrical power system 200, and/or characteristics of the wind turbines 10 (e.g., wind turbine size, location, age, maintenance status), the power grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

The wind farm electrical power system 200 can include one or more controllers, such as wind farm controller 226. Wind farm controller 226 can be configured to control the components of the wind farm electrical power system 200, including switches 208, 210 and 212, and/or implement some or all of the method steps as described herein. Wind farm controller 226 can be located within the geographic area of the wind farm electrical power system 200, or any portion thereof, or can be located remotely from the wind farm electrical power system 200, or any portion thereof. Wind farm controller 226 can be part of or included with one or more of the other controllers associated with one or more of the wind turbine power systems 100 and/or the wind farm electrical power system 200. Each of the clusters 204, wind turbine power systems 100, or turbine controllers 224, may be communicatively coupled with a wind farm controller 226.

Wind farm controller 226 can generate and send control signals to turbine controller 224 to operate switches 222 to connect or disconnect the one or more wind turbine power systems 100 from the cluster lines 220 based at least in part on the reactive power required at the POI 56. Wind farm controller 226 can generate and send control signals to switches 208, 210 and/or 212 to connect or disconnect the one or more of the clusters 204 based at least in part on the reactive power required at the POI 56, and/or based, at least in part, on characteristics of the wind turbine power system 100, wind farm electrical power system 200, and/or characteristics of the wind turbines 10 (e.g., wind turbine size, location, age, maintenance status), the power grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Figure 4:
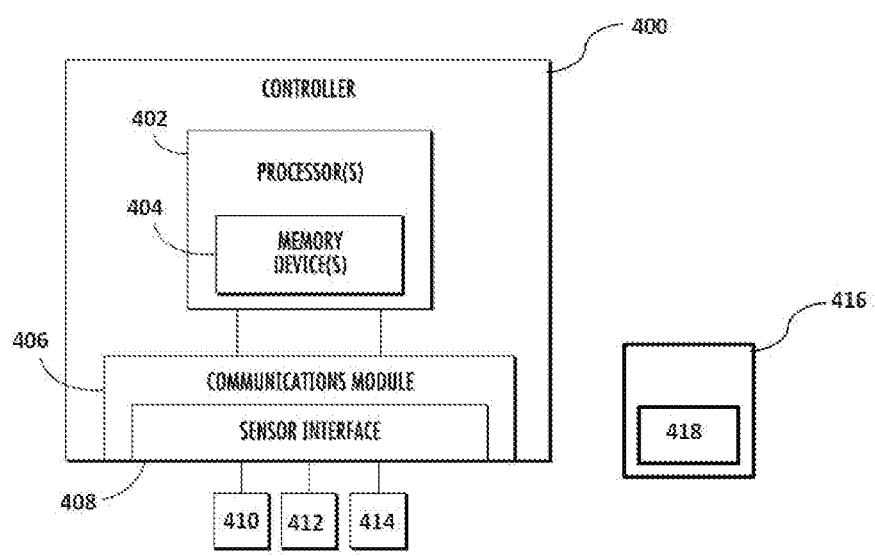
FIG. 4 depicts a block diagram of a controller according to example embodiments of the present disclosure.

FIG. 4 depicts a block diagram of a controller 400 according to example embodiments of the present disclosure. Controller 400 can be a turbine controller 224 or a wind farm controller 226. Controller 400 can include one or more processor(s) 402 and associated memory devices) 404 configured to perform a variety of computer-implemented functions (e.g., performing the methods, steps, calculations and the like and storing relevant data as disclosed herein). Memory device 404 may also store date relevant to certain characteristics of the wind turbine power system 100, wind farm electrical power system 200, and/or characteristics of the wind turbines 10 (e.g., wind turbine size, location, age, maintenance status), the power grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Additionally, controller 400 may include a communications module 406 to facilitate communications between the controller and the various components of the wind turbine power system 100, the wind farm electrical power system 200 and/or the wind farm controller 226, including communication between wind farm controller 226 and turbine controller 224. Further, the communications module 406 may include a sensor interface 408 (e.g., one or more analog-to-digital converters) to permit signals transmitted from one or more sensors 410, 412 and 414 to be converted into signals that can be understood and processed by the processors 402. Sensors 410, 412 and 414 can be used to measure, ascertain or gather data regarding characteristics of the wind turbine power system 100, wind farm electrical power system 200, and/or characteristics of the wind turbines 10 (e.g., wind turbine size, location, age, maintenance status), the power grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Controller 400 can also include a user interface 416. User interface 416 can have various configurations and controls can be mounted or in user interface 416. User interface 416 can also be located within the geographic area of the wind farm electrical power system 200, or any portion thereof, or can be located remotely from the wind farm electrical power system 200, or any portion thereof. The user interface 416 can include an input component 418. Input component 418 can be, for instance, a capacitive touch screen. The input component 418 can allow for the selective activation, adjustment or control of wind farm controller 226 and turbine controller 224, as well as any timer features or other user adjustable inputs. One or more of a variety of electrical, mechanical or electro-mechanical input devices, including rotary dials, push buttons, and touch pads, can also be used singularly or in combination as input component 418. The user interface 416 can include a display component, such as a digital or analog display device designed to provide operation feedback to a user.

It should be appreciated that the sensors 410, 412 and 414 may be communicatively coupled to the communications module 406 using any suitable means. For example, the sensors 410, 412 and 414 may be coupled to the sensor interface 408 via a wired connection. However, in other embodiments, the sensors 410, 412 and 414 may be coupled to the sensor interface 408 via a wireless connection, such as by using any suitable wireless communications protocol known in the art. As such, the processor 402 may be configured to receive one or more signals from the sensors 410, 412 and 414. Sensors 410, 412 and 414 can be part of or included with one or more of the other controllers associated with one or more of the wind turbine power systems 100 and/or the wind farm electrical power system 200. Sensors 410, 412 and 414 can also be located within the geographic area of the wind farm electrical power system 200, or any portion thereof, or can be located remotely from the wind farm electrical power system 200, or any portion thereof.

It should also be understood that sensors 410, 412 and 414 can be any number or type of voltage and/or electric current sensors may be employed within the wind turbine power systems 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the one or more controllers, such as wind farm controller 226 and turbine controller 224, are configured to receive one or more voltage and/or electric current feedback signals from sensors 410, 412 and 414.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 402 is also configured to compute advanced control algorithms and communicate to a variety of Ethernet or serial-based protocols (Modbus, OPC, CAN, etc.). Additionally, the memory device(s) 404 may generally include memory element(s) including, but not limited to, computer readable medium (e.g., random access memory (RANI)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 402, configure the controller to perform the various functions as described herein.

Figure 5:
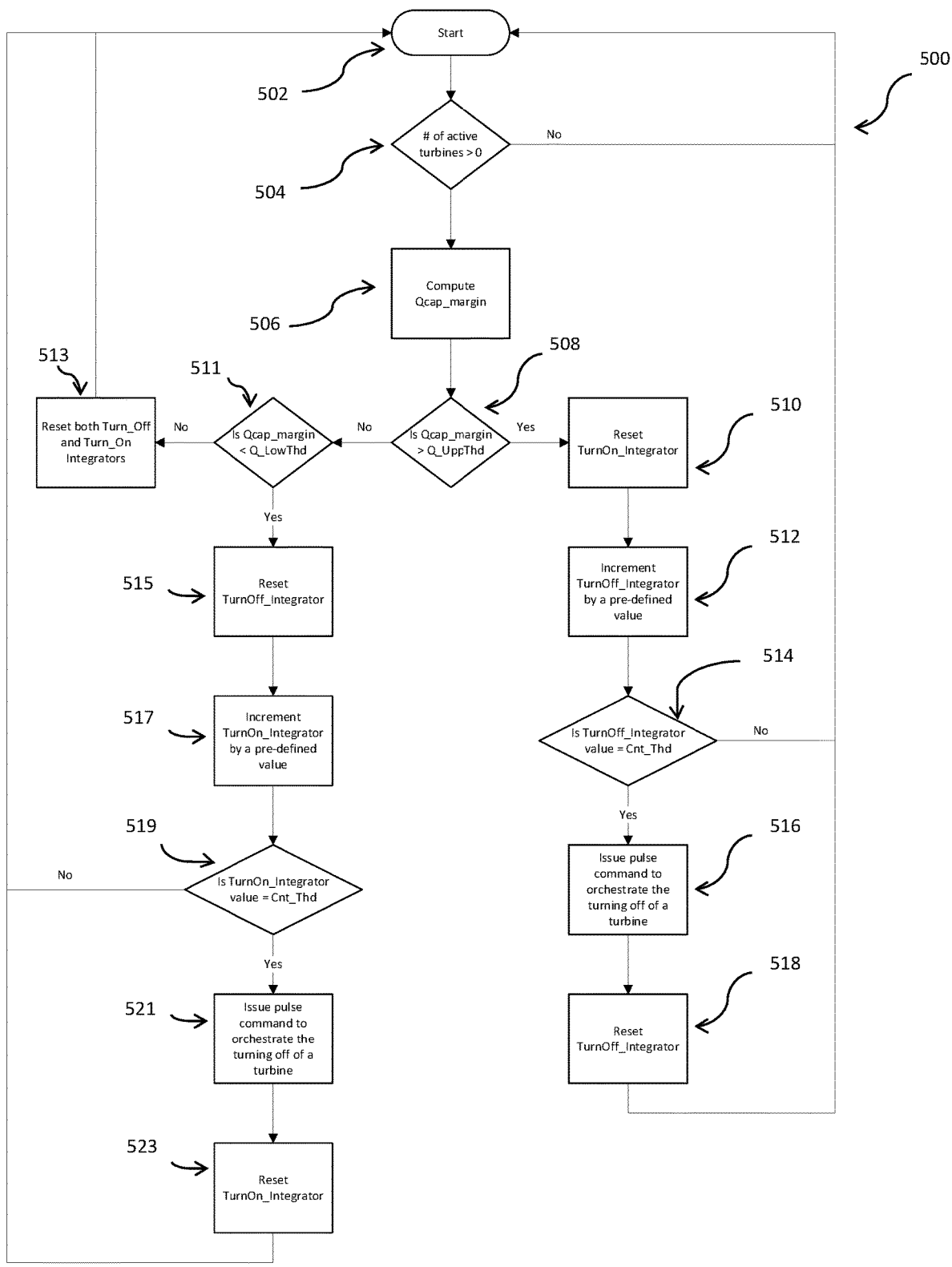
FIG. 5 depicts a flow diagram of an example method of controlling wind turbines providing reactive power and for reducing active power consumption of the wind turbines.

FIG. 5 depicts a flow diagram of an example method 500 of controlling wind turbines in a wind farm providing reactive power and reducing active power consumption of the wind turbines according to an example embodiment of the present disclosure. Method 500 can be performed by one or more controllers, such as wind farm controller 226 and/or turbine controller 224, and by the other devices included with a wind turbine power system 100 and/or wind farm electrical power system 200. FIG. 5 depicts steps of method 500 performed in a particular order for purposes of illustration and discussion. Those of ordinary skill in the art, using the disclosure provided herein, will understand that the method discussed herein can be adapted, rearranged, expanded, omitted, performed simultaneously, or modified in various ways without deviating from the scope of the present disclosure.

At (502) the method can include receiving a startup signal initiating the control algorithm for providing reactive power and reducing active power consumption of the wind turbines based. Startup signal can be generated and/or received by one or more controllers, such as wind farm controller 226 and/or turbine controller 224. Startup signal may be generated by one or more controllers, such as wind farm controller 226 and/or turbine controller 224, in response to a user input or interaction with the one or more controllers indicating a desire to initiate method 500. The user input can be provided through a user interface, such as user interface 416 (FIG. 4). Startup signal may be generated by one or more controllers, such as wind farm controller 226 and/or turbine controller 224, in response to one or more signals received from sensors 410, 412 and 414 indicative of a need for reactive power at POI 56 or indicative of one or more environmental conditions (e.g., low wind or no wind conditions at one or more wind turbines 10).

At (504) the method can include determining by the one or more controllers the number of wind turbines 10 presently activated and capable of providing reactive power. Such determination may be made based at least in part on one or more signals received by the one or more controllers (such as wind farm controller 226 and/or turbine controller 224) from sensors 410, 412 and 414 indicative of the operational state of the one or more wind turbines 10 or indicative of one or more environmental conditions (e.g., low wind or no wind conditions at one or more wind turbines 10). At (504), if the number of wind turbines 10 capable of providing reactive power is greater than zero, method 500 proceeds to (506). If no wind turbines 10 are capable of providing reactive power, method 500 returns to (502).

At (506) the method can include determining, by the wind farm controller 226, the amount of reactive power that can be provided by the one or more wind turbines 10 determined at (504) to be presently activated and capable of providing reactive power. More specifically, at (506) the wind farm controller 226 determines the total amount of reactive power (i.e., $Q_{CAP\_margin}$ in available from the one or more wind turbines 10 that are activated or operational and capable of providing reactive power.

At (508) the method can include determining, by the wind farm controller 226, the amount of reactive power required at the POI 56. Wind farm controller 226 determines the amount of reactive power required at the POI 56 (i.e., the $Q_{\_UppThd}$, upper threshold) via a reactive power (VAR) regulator. The amount of reactive power required at the POI 56, is the amount of reactive power required for voltage regulation, VAR and power factor regulation based on present grid conditions.

At (508) the method further includes comparing, by the wind farm controller 226, the total amount of reactive power (i.e., the $Q_{CAP\_margin}$) available from the one or more wind turbines 10 that are activated or operational and capable of providing reactive power with the amount of reactive power required at the POI 56 (i.e., the $Q_{\_UppThd}$). In some instances $Q_{\_UppThd}$ can correspond to the upper limit of a hysteresis window associated with the amount of reactive power required at the POI 56. The hysteresis window associated with the POI 56 represents fluctuations in the amount of reactive power present at the POI 56 which do not adversely affect the stability of the power grid. In some circumstances the hysteresis window is based on the tolerances of the electrical equipment at the POI 56 or in the electrical power system 200. In some instances the hysteresis window is within 10% of the amount of reactive power required at the POI 56 to maintain the stability of the power grid. If $Q_{CAP\_margin}$ is greater than the $Q_{\_UppThd}$, method 500 proceeds to (510). If $Q_{CAP\_margin}$ is less than the $Q_{\_UppThd}$, method 500 proceeds to (511).

At (510) the method can include resetting or cancelling one or more control signals or settings (i.e., TurnOn_Integrator) utilized by the wind farm controller 226 to establish a predetermined period of time after which an activation control signal can be generated by the wind farm controller 226 for turning on or activating or bringing operational one or more wind turbines 10, such that the one or more turbines 10 are capable of providing reactive power.

At (512) the method can include wind farm controller 226, generating or implementing one or more control signals or settings (i.e., TurnOff_Integrator) utilized by the wind farm controller 226 to establish a predetermined period of time after which a deactivation control signal can be generated by the wind farm controller 226 for turning off or deactivating one or more wind turbines 10, such that the one or more turbines 10 are not capable of providing reactive power and do not consume real power. For example, TurnOff_Integrator can be associated with a predetermined period of time, which is specific to, or based, at least in part, on characteristics of a particular wind turbine power system 100, a particular wind farm electrical power system 200, and/or characteristics of the wind turbines 10 (e.g., wind turbine size, location, age, maintenance status), the power grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

At (514) the method can include wind farm controller 226, comparing the TurnOff_Integrator control signal with a threshold (i.e., Cnt_Thd). Cnt_Thd may correspond to zero or the expiration of the predetermined period of time associated with the TurnOff_Integrator control signal. At (514), if TurnOff_Integrator is greater than Cnt_Thd, method 500 returns to (502). If TurnOff_Integrator is less than or equal to Cnt_Thd, method 500 proceeds to (516).

At (516) the method can include wind farm controller 226 generating a deactivation control command to deactivate one or more wind turbines, such that the operational state of the one or more turbines is such that the one or more wind turbines are not capable of providing reactive power and are thus, not consuming real power. The deactivation control command can be executed by the wind farm controller 226. Alternatively, the deactivation control command can be communicated from the wind farm controller 226 to and executed by the one or more wind turbine controllers 224.

At (518) the method can include resetting or cancelling one or more control signals or settings (i.e., TurnOff_Integrator) utilized by the wind farm controller 226 to establish a predetermined period of time after which a deactivation control signal can be generated by the wind farm controller 226 for turning off or deactivating one or more wind turbines 10, such that the one or more turbines 10 are not capable of providing reactive power. After the TurnOff_Integrator is reset or cancelled at (518), method 500 returns to (502).

At (511) the method further includes comparing, by the wind farm controller 226, the total amount of reactive power (i.e., the $Q_{CAP\_margin}$) available from the one or more wind turbines 10 that are activated or operational and capable of providing reactive power to a lower threshold (i.e., $Q_{\_LowThd}$—lower threshold). In some instances, the lower threshold, $Q_{\_LowThd}$, can correspond to a lower limit of a hysteresis window associated with the amount of reactive power required at the POI 56. At (511), if $Q_{CAP\_margin}$ is greater than the $Q_{\_LowThd}$, method 500 proceeds to (513). However, $Q_{CAP\_margin}$ is less than the $Q_{\_LowThd}$, method 500 proceeds to (515).

At (513) the method can include resetting or cancelling one or more control signals or settings (i.e., TurnOn_Integrator and TurnOff_Integrator) utilized by the wind farm controller 226 to establish one or more predetermined periods of time after which an activation control signal can be generated by the wind farm controller 226 for turning on or activating and/or turning off or deactivating one or more wind turbines 10, based at least in part on the reactive power requirements at the point of interconnection, such as POI 56 shown in FIG. 3. Following (513) method 500 returns to (502).

At (515) the method can include resetting or cancelling one or more control signals or settings (i.e., TurnOff_Integrator) utilized by the wind farm controller 226 to establish a predetermined period of time after which a deactivation control signal can be generated by the wind farm controller 226 for turning off or deactivating one or more wind turbines 10, such that the one or more turbines 10 are not capable of providing reactive power and do not consume real power.

At (517) the method can include wind farm controller 226, generating or implementing one or more control signals or settings (i.e., TurnOn_Integrator) utilized by the wind farm controller 226 to establish a predetermined period of time after which an activation control signal can be generated by the wind farm controller 226 for turning on or activating one or more wind turbines 10, such that the one or more turbines 10 are capable of providing reactive power to satisfy the reactive power requirements at the POI, such as POT 56 shown in FIG. 3. For example, TurnOn_Integrator can be associated with a predetermined period of time, which is specific to, or based, at least in part, on characteristics of a particular wind turbine power system 100, a particular wind farm electrical power system 200, and/or characteristics of the wind turbines 10 (e.g., wind turbine size, location, age, maintenance status), the power grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

At (519) the method can include comparing, by one or more controllers, such as wind farm controller 226, the TurnOn_Integrator control signal with a threshold (i.e., TurnOn_Cnt_Thd). TurnOn_Cnt_Thd may correspond to zero or the expiration of the predetermined period of time associated with the TurnOn_Integrator control signal. At (514), if TurnOn_Integrator is greater than TurnOn_Cnt_Thd, method 500 returns to (502). If TurnOn_Integrator is less than or equal to TurnOn_Cnt_Thd, method 500 proceeds to (521).

At (521) the method can include one or more controllers, such as wind farm controller 226, generating an activation control command to activate one or more wind turbines, such that the operational state of the one or more turbines is such that the one or more wind turbines are capable of providing reactive power. The activation control command can be executed by the wind farm controller 226. Alternatively, the activation control command can be communicated from the wind farm controller 226 to and be executed by the one or more wind turbine controllers 224.

At (523) the method can include resetting or cancelling one or more control signals or settings (i.e., TurnOn_Integrator) utilized by the wind farm controller 226 to establish a predetermined period of time after which an activation control signal can be generated by the wind farm controller 226 for turning on or activating one or more wind turbines 10, such that the one or more turbines 10 are capable of providing reactive power. After the TurnOn_Integrator is reset or cancelled at (523), method 500 returns to (502).

Figure 6:
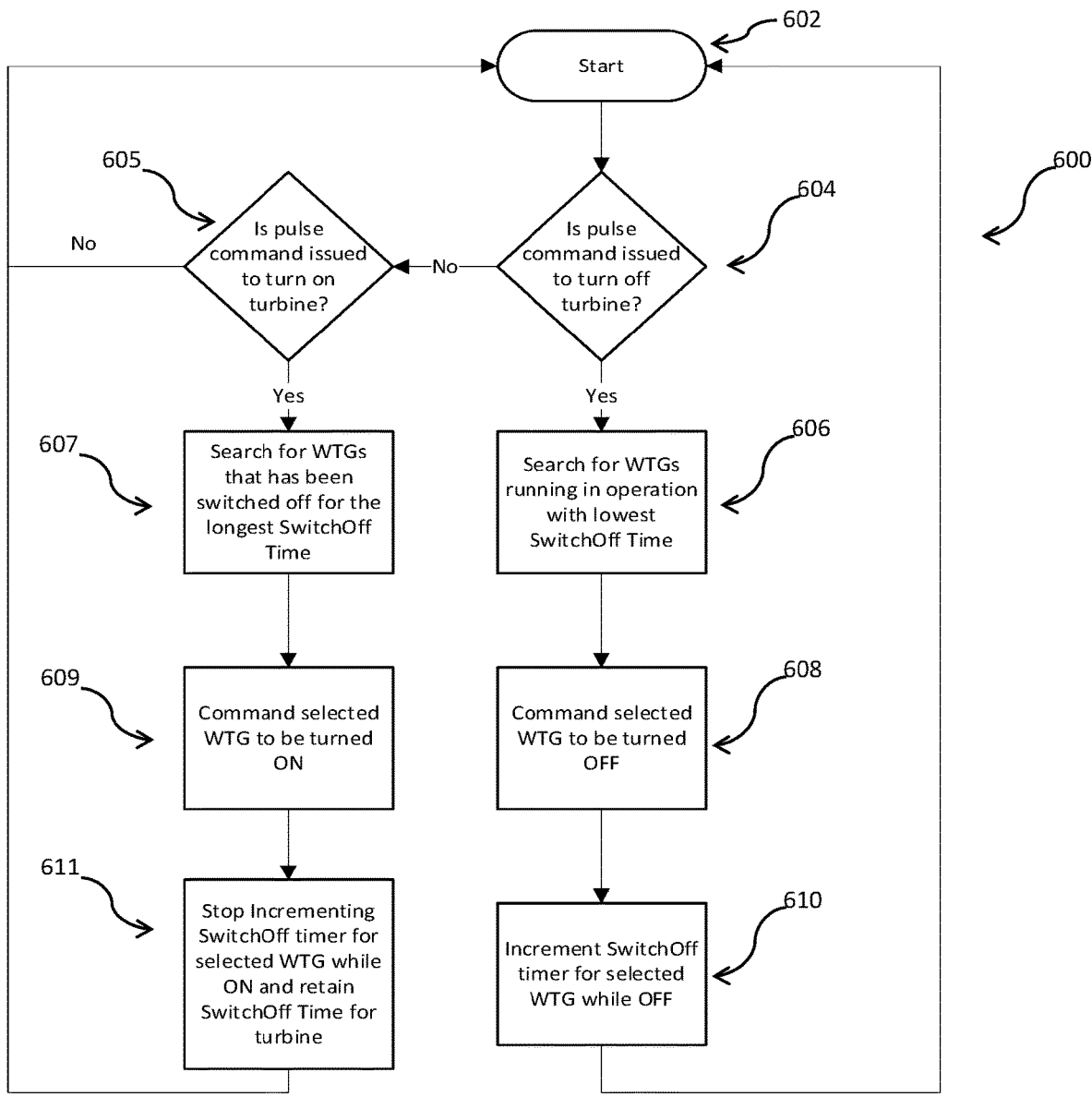
FIG. 6 depicts a flow diagram of a portion of an example method of controlling wind turbines providing reactive power and for reducing active power consumption of the wind turbines.

FIG. 6 depicts a flow diagram of a portion of an example method 600 of controlling wind turbines in a wind farm providing reactive power and reducing active power consumption of the wind turbines according to an example embodiment of the present disclosure. More particularly, FIG. 6 depicts a flow diagram of an example method 600 of selectively activating and/or deactivating wind turbines in a wind farm providing reactive power and reducing active power consumption of the wind turbines according to an example embodiment of the present disclosure. Method 600 can be performed by one or more controllers, such as wind farm controller 226 and/or turbine controller 224, and by the other devices included with a wind turbine power system 100 and/or wind farm electrical power system 200. Method 600 can be performed in conjunction with or concurrently with method 500. More specifically, method 600 can be performed following method steps (516) and/or (521) of method 500. FIG. 6 depicts steps of method 600 performed in a particular order for purposes of illustration and discussion. Those of ordinary skill in the art, using the disclosure provided herein, will understand that the method discussed herein can be adapted, rearranged, expanded, omitted, performed simultaneously, or modified in various ways without deviating from the scope of the present disclosure.

At (602) the method can include receiving a startup signal initiating the control algorithm for selectively activating and/or deactivating wind turbines providing reactive power and reducing active power consumption of the wind turbines based. Startup signal can be generated and/or received by one or more controllers, such as wind farm controller 226 and/or turbine controller 224. Startup signal may be generated by one or more controllers, such as wind farm controller 226 and/or turbine controller 224, in response to a user input or interaction with the one or more controllers indicating a desire to initiate method 500. The user input can be provided through a user interface, such as user interface 416 (FIG. 4). Alternatively, startup signal at (602) can be the deactivation control command generated at (516) or activation control command generated at (521).

At (604) the method can include detecting, by one or more controllers, such as wind turbine controller 224 or wind farm controller 226, the generation of a deactivation command by the wind farm controller 226, such as the command generated at (516) of method 500. If a deactivation command is detected method proceeds to (606). 1*f* a deactivation command is not detected, method proceeds to (605).

At (606) the method can include determining, by one or more controllers, such as wind turbine controller 224 or wind farm controller 226, certain characteristics of the one or more wind turbines 10, including determining which turbines are activated to provide reactive power capability. At (606) the method further includes determining, by one or more controllers, such as wind turbine controller 224 or wind farm controller 226, the wind turbines 10 which include the longest run time or have been activated for the longest period of time. Such determination is based at least in part on data collected and/or stored at wind turbine controller 224 related to the time period during which each of the one or more wind turbine 10 has been operational.

At (608) the method can include selecting, by one or more controllers, one or more wind turbines 10 to deactivate based at least in part on a comparison of the timer periods during which each of the one or more wind turbines 10 have not been operational. At (608) the method can further include generating a deactivation control command to deactivate one or more wind turbines, based at least in part on the comparison of the time period during which each of the one or more wind turbines have not been operational, such that the operational state of the one or more turbines that have been nonoperational for the least amount of time are such that the one or more wind turbines are not capable of providing reactive power and are thus, not consuming real power.

At (610) the method can include activating one or more timers or control settings utilized by the wind farm controller 226 or wind turbine controller 224 to monitor or record data related to the time period during which the one or more wind turbines 10 remain disabled or in a nonoperational state such that the one or more wind turbines are not capable of providing reactive power and are thus, not consuming real power. After the one or more timers are set at (610), method 600 returns to (602).

At (605) the method can include detecting, by one or more controllers, such as wind turbine controller 224 or wind farm controller 226, the generation of a activation command by the wind farm controller 226, such as the command generated at (521) of method 500. If an activation command is detected method proceeds to (607). If an activation command is not detected, method returns to (602).

At (607) the method can include determining, by one or more controllers, such as wind turbine controller 224 or wind farm controller 226, certain characteristics of the one or more wind turbines 10, including determining which turbines are not activated to provide reactive power. At (607) the method further includes determining, by one or more controllers, such as wind turbine controller 224 or wind farm controller 226, the wind turbines 10 which include the longest nonoperational time or have been deactivated for the longest period of time. Such determination is based at least in part on data collected and/or stored at wind turbine controller 224 related to the time period during which each of the one or more wind turbine 10 has not been operational.

At (609) the method can include selecting, by one or more controllers, one or more wind turbines 10 to activate based at least in part on a comparison of the time periods during which each of the one or more wind turbines 10 have not been operational. At (609) the method can further include generating an activation control command to activate one or more wind turbines, based at least in part on the comparison of the time period during which each of the one or more wind turbines have not been operational, such that the operational state of the one or more turbines that have been nonoperational for the most amount of time are such that the one or more wind turbines are capable of providing reactive power.

At (611) the method can include activating one or more timers or control settings utilized by the wind farm controller 226 or wind turbine controller 224 to monitor or record data related to the time period during which the one or more wind turbines 10 remain activated or in an operational state such that the one or more wind turbines are capable of providing reactive power. After the one or more timers are set at (611), method 600 returns to (602).

Figure 7:
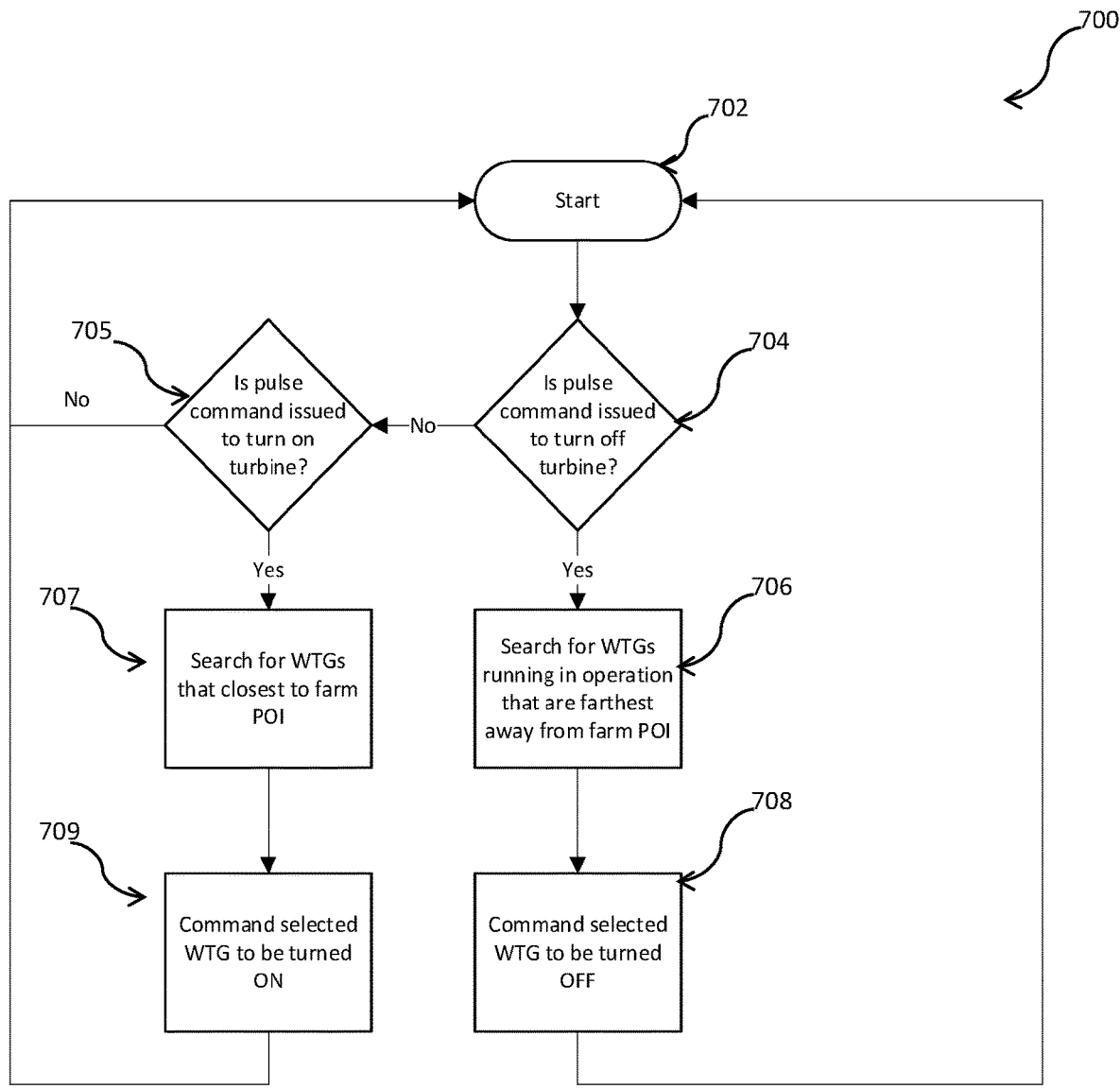
FIG. 7 depicts a flow diagram of a portion of an example method of controlling wind turbines providing reactive power and for reducing active power consumption of the wind turbines.

FIG. 7 depicts a flow diagram of a portion of an example method 700 of controlling wind turbines in a wind farm providing reactive power and reducing active power consumption of the wind turbines according to an example embodiment of the present disclosure. More particularly, FIG. 7 depicts a flow diagram of an example method 6700 of selectively activating and/or deactivating wind turbines in a wind farm providing reactive power and reducing active power consumption of the wind turbines according to an example embodiment of the present disclosure. Method 700 can be performed by one or more controllers, such as wind farm controller 226 and/or turbine controller 224, and by the other devices included with a wind turbine power system 100 and/or wind farm electrical power system 200. Method 700 can be performed in conjunction with or concurrently with methods 500 and/or 600. More specifically, method 700 can be performed following method steps (516) and/or (521) of method 500. FIG. 7 depicts steps of method 700 performed in a particular order for purposes of illustration and discussion. Those of ordinary skill in the art, using the disclosure provided herein, will understand that the method discussed herein can be adapted, rearranged, expanded, omitted, performed simultaneously, or modified in various ways without deviating from the scope of the present disclosure.

At (702) the method can include receiving a startup signal initiating the control algorithm for selectively activating and/or deactivating wind turbines providing reactive power and reducing active power consumption of the wind turbines based. Startup signal can be generated and/or received by one or more controllers, such as wind farm controller 226 and/or turbine controller 224. Startup signal may be generated by one or more controllers, such as wind farm controller 226 and/or turbine controller 224, in response to a user input or interaction with the one or more controllers indicating a desire to initiate method 700. The user input can be provided through a user interface, such as user interface 416 (FIG. 4). Alternatively, startup signal at (702) can be the deactivation control command generated at (516) or activation control command generated at (521).

At (704) the method can include detecting, by one or more controllers, such as wind turbine controller 224 or wind farm controller 226, the generation of a deactivation command by the wind farm controller 226, such as the command generated at (516) of method 500. If a deactivation command is detected method proceeds to (706). If a deactivation command is not detected, method proceeds to (705).

At (706) the method can include determining, by one or more controllers, such as wind turbine controller 224 or wind farm controller 226, certain characteristics of the one or more wind turbines 10, including determining which turbines are activated to provide reactive power capability. At (606) the method further includes determining, by one or more controllers, such as wind turbine controller 224 or wind farm controller 226, the wind turbines 10 which are in a location that is furthest from the point of interconnection, such as POI 56. Such determination is based at least in part on data collected and/or stored at wind turbine controller 224 or wind farm controller 226, related to the physical location of each of the one or more wind turbines 10.

At (708) the method can include selecting, by one or more controllers, one or more wind turbines 10 to deactivate based at least in part on a comparison of the physical distances that each of the one or more wind turbines 10 is from the POI 56. At (708) the method can further include generating a deactivation control command to deactivate one or more wind turbines, based at least in part on the comparison of the physical distances from that POI 56 for each of the one or more wind turbines, such that the operational state of the one or more turbines that are furthest from the POI are deactivated such that the one or more wind turbines are not capable of providing reactive power and are thus, not consuming real power. After (708), method 700 returns to (702).

At (705) the method can include detecting, by one or more controllers, such as wind turbine controller 224 or wind farm controller 226, the generation of a activation command by the wind farm controller 226, such as the command generated at (521) of method 500. If an activation command is detected method proceeds to (707). If an activation command is not detected, method returns to (702).

At (707) the method can include determining, by one or more controllers, such as wind turbine controller 224 or wind farm controller 226, certain characteristics of the one or more wind turbines 10, including determining which turbines are physically closest to the POI 56. At (707) the method further includes determining, by one or more controllers, such as wind turbine controller 224 or wind farm controller 226, the wind turbines 10 which physically closest to POI 56. Such determination is based at least in part on data collected and/or stored at wind turbine controller 224 or wind farm controller 226, related to the physical location of each of the one or more wind turbines 10.

At (709) the method can include selecting, by one or more controllers, one or more wind turbines 10 to activate based at least in part on a comparison of the physical distances that each of the one or more wind turbines 10 is from POI 56. At (709) the method can further include generating an activation control command to activate one or more wind turbines, based at least in part on the comparison of the physical distances from the POI 56 for each of the one or more wind turbines, such that the operational state of the one or more turbines that are physically closest to the POI are activated such that the one or more wind turbines are capable of providing reactive power to the power grid. After (709), method 700 returns to (702).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind farm electrical power system, wherein the wind farm electrical power system includes a controller and one or more wind turbines electrically connected to a power grid through a point of interconnection, the method comprising:
   receiving, by the controller, one or more signals from a sensor associated with the one or more wind turbines;
   determining, by the controller, one or more wind turbines that are operating in low wind or no wind conditions based, at least in part, on the one or more of the sensor signals;
   determining, by the controller, a reactive power capability of the one or more wind turbines operating in low wind or no wind conditions;
   determining, by the controller, one or more thresholds based, at least in part, on a level of reactive power required at the point of interconnection;

identifying, by the controller, a distance between each of the one or more wind turbines and the point of interconnection;

comparing, by the controller, the reactive power capability of the one or more wind turbines operating in low wind or no wind conditions to the one or more thresholds, wherein the one or more thresholds are based at least in part on a hysteresis window associated with the reactive power requirement at the point of interconnection and wherein the one or more thresholds include, at least, an upper threshold and a lower threshold;

generating, by the controller, one or more control signals based, at least in part, on the reactive power capability of the one or more wind turbines operating in low wind or no wind conditions, the comparison of the reactive power capability to the one or more thresholds, and the distance between each of the one or more wind turbines and the point of interconnection; and controlling an operational state of the one or more wind turbines based, at least in part, on the one or more control signals.

2. The method of claim 1, wherein controlling an operational state of the one or more wind turbines based, at least in part, on the one or more control signals further comprises:

deactivating one or more wind turbines operating in low wind or no wind conditions when the reactive power capability of the one or more wind turbines operating in low wind or no wind conditions exceeds the upper threshold.

3. The method of claim 1, wherein controlling an operational state of the one or more wind turbines based, at least in part, on the one or more control signals further comprises:

determining, by the controller, one or more wind turbines that are deactivated and are located in low wind or no wind conditions based, at least in part, on the one or more of the sensor signals;

activating one or more of the deactivated wind turbines when the reactive power capability of the one or more wind turbines operating in low wind or no wind conditions is less than the lower threshold.

4. The method of claim 1, wherein the method further comprises:

identifying, by the controller, an operational run time for each of the one or more wind turbines, wherein the operational run time corresponds to a period of time during which the one or more wind turbines are in an operational state and providing reactive power or real power to the power grid; and controlling the operational state of one or more wind turbines based, at least in part, on the operational run time of the one or more of the wind turbines.

5. The method of claim 1, wherein the method further comprises:

comparing, by the controller, the reactive power capability of the one or more wind turbines to the upper threshold;

comparing, by the controller, the reactive power capability of the one or more wind turbines to the lower threshold when the reactive power capability of the one or more wind turbines is less than the upper threshold;

generating, by the controller, one or more control signals when the reactive power capability of the one or more wind turbines is less than the lower threshold; and controlling the operational state of one or more wind turbines based, at least in part, on the one or more control signals, such that one or more of the wind turbines is activated and placed in an operational state such that the one or more wind turbines provide reactive power capability to the power grid.

6. The method of claim 1, wherein the method further comprises:

identifying, by the controller, a period of non-operation for each of the one or more wind turbines, wherein the period of non-operation corresponds to a period of time during which the one or more wind turbines are not capable of providing reactive power or real power to the power grid; and controlling the operational state of one or more wind turbines based, at least in part, on the period of non-operation.

7. The method of claim 1, wherein the low wind condition comprises a wind speed that is below a wind threshold, said wind threshold corresponding to an amount of wind at which one of the wind turbines can generate an amount of real power which is less than an amount of real power consumed by the wind turbine.

8. A control system for operating a wind farm electrical power system, wherein the wind farm electrical power system includes one or more wind turbines electrically connected to a power grid through a point of interconnection, the control system comprising:

one or more processors;

one or more memory devices, wherein the one or more memory devices configured to store instructions that when executed by the one or more processors cause the one or more processors to perform operations, the operations comprising:

receiving, by the controller, one or more signals from a sensor associated with the one or more wind turbines;

determining, by the controller, one or more wind turbines that are operating in low wind or no wind operating conditions based, at least in part, on the one or more of the sensor signals;

determining, by the controller, a reactive power capability of the one or more wind turbines operating in low wind or no wind conditions;

determining, by the controller, one or more thresholds based, at least in part, on a level of reactive power required at the point of interconnection;

identifying, by the controller, a distance between each of the one or more wind turbines and the point of interconnection;

comparing, by the controller, the reactive power capability of the one or more wind turbines operating in low wind or no wind conditions to the one or more thresholds, wherein the one or more thresholds are based at least in part on a hysteresis window associated with the reactive power requirement at the point of interconnection and wherein the one or more thresholds include, at least, an upper threshold and a lower threshold;

generating, by the controller, one or more control signals based, at least in part, on the reactive power capability of the one or more wind turbines operating in low wind or no wind conditions, the comparison of the reactive power capability to the one or more thresholds, and the distance between each of the one or more wind turbines and the point of interconnection;

controlling an operational state of the one or more wind turbines based, at least in part, on the one or more control signals.

9. The control system of claim 8, wherein operations further comprise:

deactivating one or more wind turbines operating in low wind or no wind conditions when the reactive power capability of the one or more wind turbines operating in low wind or no wind conditions exceeds the upper threshold.

10. The control system of claim 8, wherein the operation of controlling an operational state of the one or more wind turbines based, at least in part, on the one or more control signal further comprises:
   determining, by the controller, one or more wind turbines that are deactivated and are located in low wind or no wind conditions based, at least in part, on the one or more of the sensor signals;
   activating one or more of the deactivated wind turbines when the reactive power capability of the one or more wind turbines operating in low wind or no wind conditions is less than the lower threshold.

11. The control system of claim 8, wherein operations further comprise:
   identifying, by the controller, an operational run time for each of the one or more wind turbines, wherein the operational run time is a period of time during which the one or more wind turbines are in an operational state to provide reactive power or real power to the power grid; and
   controlling the operational state of one or more wind turbines based, at least in part, on the operational run time of the one or more of the wind turbines.

12. The control system of claim 8, wherein operations further comprise:
   comparing, by the controller, the reactive power capability of the one or more wind turbines to the upper threshold;
   comparing, by the controller, the reactive power capability of the one or more wind turbines to the lower threshold when the reactive power capability of the one or more wind turbines is less than the upper threshold;
   generating, by the controller, one or more control signals when the reactive power capability of the one or more wind turbines is less than the lower threshold; and
   controlling the operational state of one or more wind turbines based, at least in part, on the one or more control signals, such that one or more of the wind turbines is activated and placed in an operational state such that the one or more wind turbines provide reactive power capability to the power grid.

13. The control system of claim 8, wherein operations further comprise:
   identifying, by the controller, a period of non-operation for each of the one or more wind turbines, wherein the period of non-operation is a period of time during which the one or more wind turbines are no capable of providing reactive power or real power to the power grid; and
   controlling the operational state of one or more wind turbines based, at least in part, on the period of non-operation.

14. A wind farm, comprising:
   one or more wind turbines electrically connected to a power grid through a point of interconnection;
   a controller configured to perform one or more operations, the one or more operations comprising:
   receiving, by the controller, one or more signals from a sensor associated with the one or more wind turbines;
   determining, by the controller, one or more wind turbines that are operating in low wind or no wind operating conditions based, at least in part, on the one or more of the sensor signals;
   determining, by the controller, a reactive power capability of the one or more wind turbines operating in low wind or no wind conditions;
   determining, by the controller, one or more thresholds based, at least in part, on a level of reactive power required at the point of interconnection;
   identifying, by the controller, a distance between each of the one or more wind turbines and the point of interconnection;
   comparing, by the controller, the reactive power capability of the one or more wind turbines operating in low wind or no wind conditions to the one or more thresholds wherein the one or more thresholds are based at least in part on a hysteresis window associated with the reactive power requirement at the point of interconnection and wherein the one or more thresholds include, at least, an upper threshold and a lower threshold;
   generating, by the controller, the one or more control signals based, at least in part, on the reactive power capability of the one or more wind turbines operating in low wind or no wind conditions, on said comparison of the reactive power capability to the one or more thresholds, and the distance between each of the one or more wind turbines and the point of interconnection; and
   controlling an operational state of the one or more wind turbines based, at least in part, on the one or more control signals.

* * * * *